Figure 1:
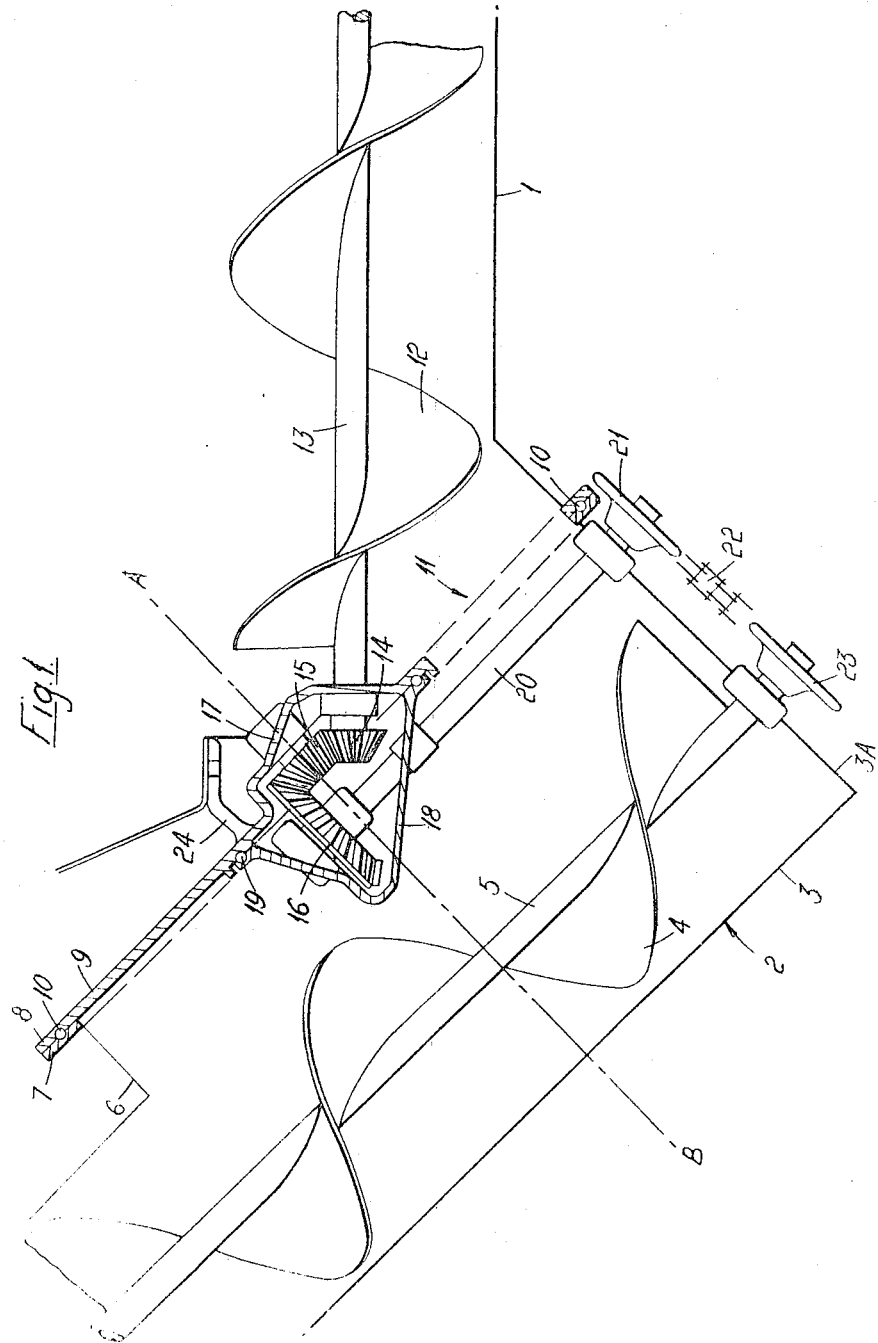

United States Patent
Herbsthofer

[15] 3,664,525
[45] May 23, 1972

[54] ROTATING GRAIN TANK UNLOADER

[72] Inventor: Franz Joseph Herbsthofer, Kassel-Harleshausen, Germany

[73] Assignee: Massey-Ferguson G.m.b.H., Kassel, Germany

[22] Filed: July 6, 1970

[21] Appl. No.: 52,489

[30] Foreign Application Priority Data

July 25, 1969 Great Britain......................37,523/69

[52] U.S. Cl............................214/17 D, 214/83.32, 214/522
[51] Int. Cl..........................................................B65g 65/46
[58] Field of Search............214/83.26, 522, 17 D, 99, 83.32; 198/100

[56] References Cited

UNITED STATES PATENTS

| | | | |
|---|---|---|---|
| 2,960,320 | 11/1960 | Heider | 214/83.32 X |
| 3,108,703 | 10/1963 | Horne et al. | 214/522 |
| 2,783,907 | 3/1957 | Hudgins | 214/522 |
| 985,436 | 2/1911 | Mount | 198/100 |

*Primary Examiner*—Gerald M. Forlenza
*Assistant Examiner*—Jerold M. Forsberg
*Attorney*—Gerhardt, Greenlee & Farris

[57] ABSTRACT

A grain handling apparatus for a combine harvester including a horizontal transfer auger in the bottom of the tank for conveying grain to a discharge opening in the bottom of the tank and a discharge conveyor including a conduit and a discharge auger. The lower end of the discharge conveyor is rotatably mounted in continuous communication with the discharge opening for movement about an axis extending transversely of the conduit between an unloading position inclined upwardly and outwardly and an out of use position. The discharge auger is driven by the transfer auger through bevel gears, an intermediate shaft rotatable about an axis parallel to the axis of the discharge auger, sprockets on the discharge auger and the intermediate shaft outside the conduit and an endless chain trained around the sprockets.

3 Claims, 5 Drawing Figures

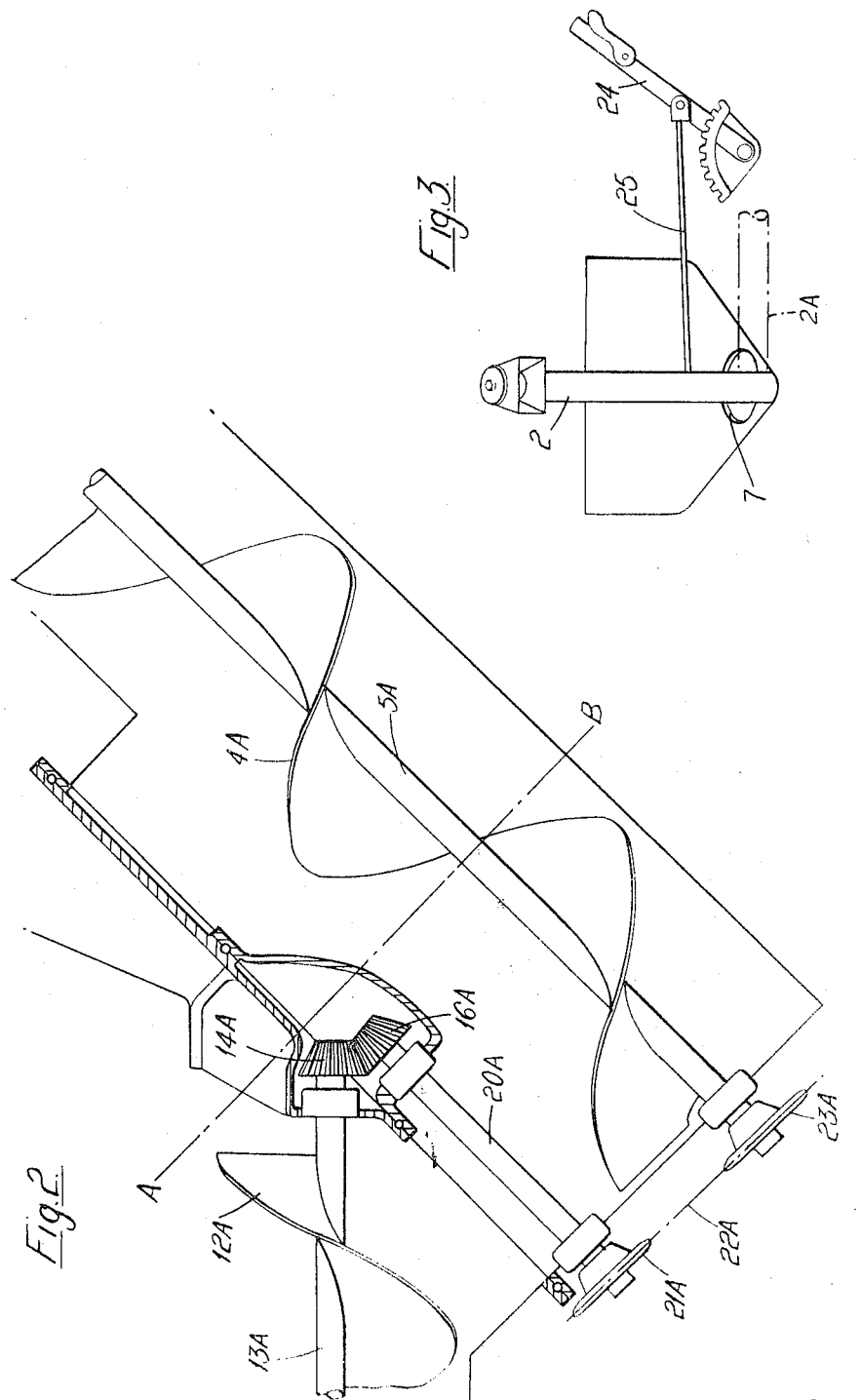

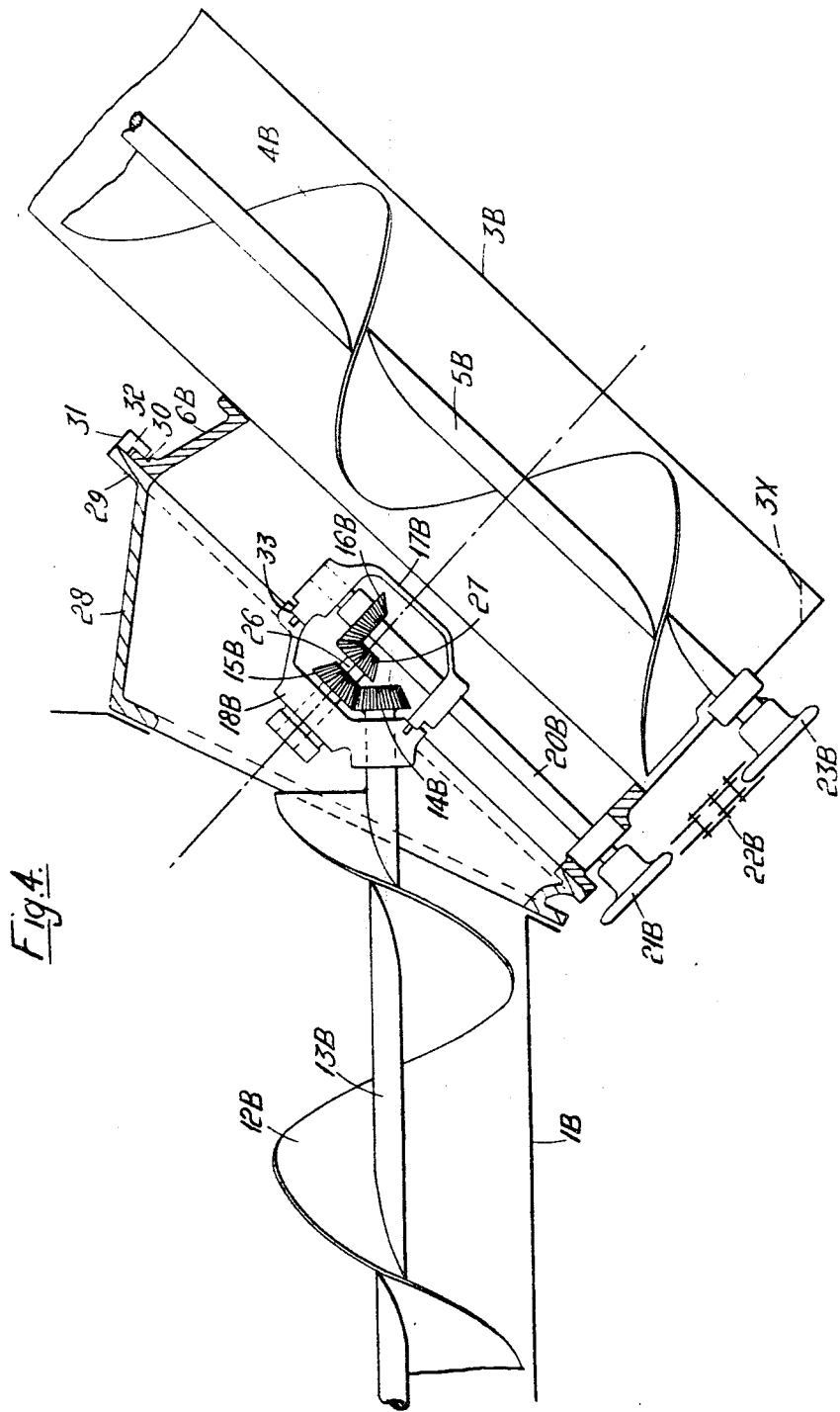

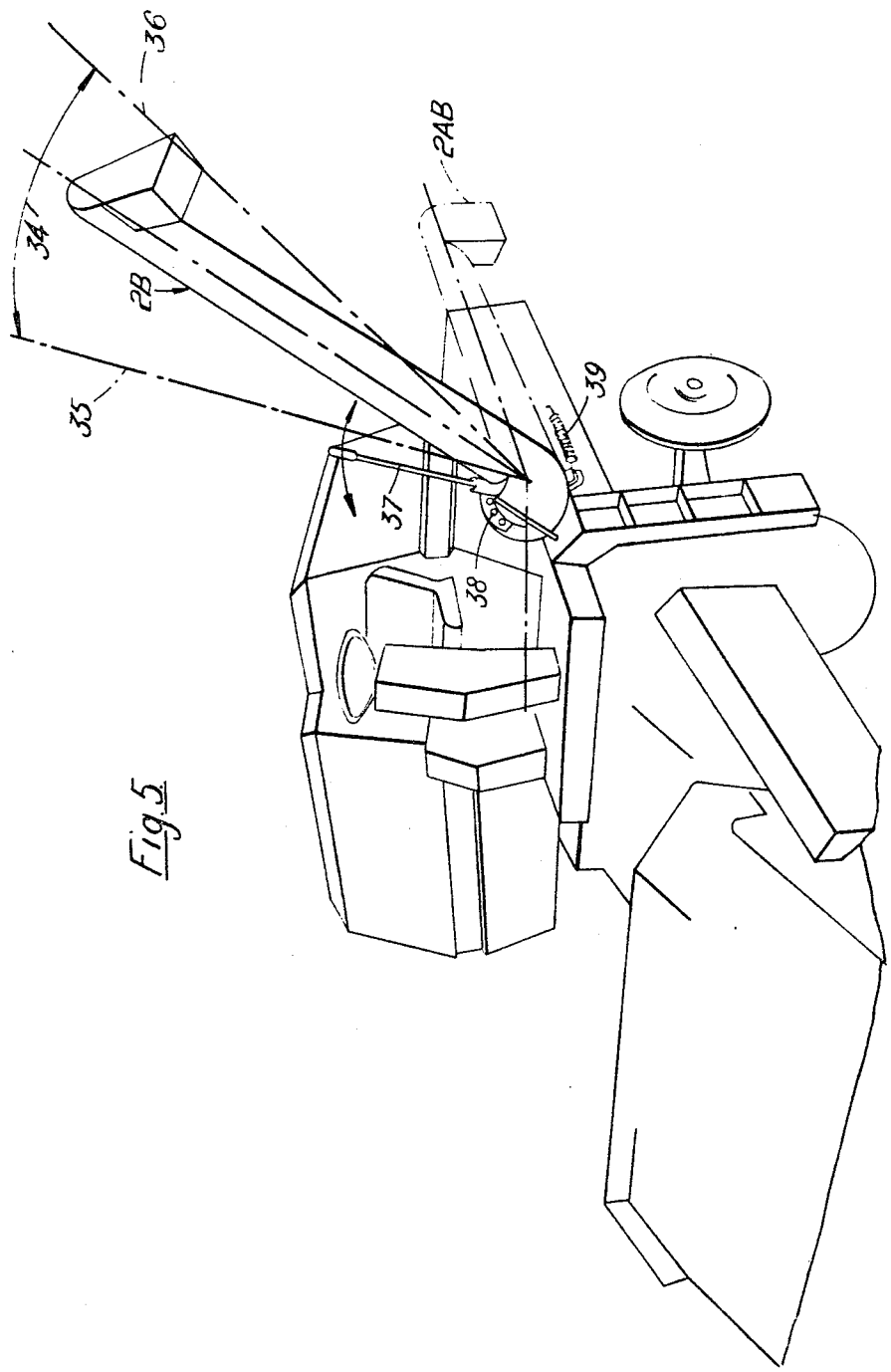

ROTATING GRAIN TANK UNLOADER

This invention relates to a grain tank for a combine harvester, and in particular, to a novel unloading conveyor for removing grain from the grain tank.

Unloading conveyors for combine harvesters comprise a tubular conduit and an auger extending internally along same, the conveyor, in use, projecting upwardly and laterally from the tank. At or adjacent its lower end, the conduit is connected to the tank, a feed passage is provided between the conduit and the tank, and, in use, an auger in the tank feeds grain through said passage into the conduit, and the grain is conveyed up the conduit to its outlet by the conveyor auger. The auger in the tank drives the conveyor auger. Also, the conveyor is movable from its in-use position to an out-of-use position more suitable for road travel. The conveyor is also moved to its out-of-use position, when necessary to avoid trees, for example, during field work.

According to the present invention I provide a grain tank and an unloading conveyor of the type set forth above, in which the conduit is rotatably mounted on the tank about an axis extending transversely of the conduit, and the tank auger has a driving connection with the conveyor auger including bevel gearing so as to be swingable from its in-use position to an out-of-use position, and in which the conveyor auger extends substantially to the lower end of the conduit, and said driving connection also includes an intermediate shaft parallel to the shaft of the conveyor auger, driven by said bevel gearing, and in driving connection with the shaft of the conveyor auger externally of the lower end of the conduit.

Embodiments of the invention will now be described, by way of example, with reference to the accompanying diagrammatic drawings, in which:

FIG. 1 is a fragmentary sectional end view of a first embodiment of a grain tank and an unloading conveyor, the latter being in its in-use position, FIG. 2 is a view corresponding to FIG. 1 of a second embodiment, FIG. 3 is a side view corresponding to FIGS. 1 and 2 to a smaller scale, FIG. 4 is a view corresponding to FIG. 1 of a third embodiment, and FIG. 5 is a perspective view of a combine harvester embodying a grain tank and unloading conveyor as shown in FIG. 4.

Referring to FIG. 1, a grain tank is indicated at 1 and an unloading conveyor at 2. The latter has a tubular conduit 3 housing an auger 4 which has a shaft 5. The conduit 3, adjacent its lower end at one side, has a collar 6 carrying a flange 7 which is secured to a flange 8 on a plate 9, ball bearings 10 being located between the flanges 7 and 8, so that the conveyor 2 can be swung about the transverse axis AB to an out-of-use position in which the conveyor 2 lies alongside the tank 1 and extends fore-and-aft in the direction of travel, as is shown chain-dotted in FIG. 3 at 2A. A passage 11 is provided in the plate 9 so that grain may pass from the tank 1 to the conduit 3, and an auger 12 having a shaft 13 is provided in the tank 1 for feeding grain through the passage 11.

The shaft 13 is driven and has a driving connection with the shaft 5 as will now be described. The shaft 13 has a bevel gear wheel 14 meshing with a bevel gear wheel 15 which in turn meshes with a bevel gear wheel 16. The gear wheels 14, 15, 16 are located in a casing of which one part 17 is formed by part of the plate 9, and another part 18, the two parts 17, 18 having ball bearings 19 located between them. The rotary axis of the gear wheel 15 coincides with the axis AB, so that the gear wheels 14, 15, 16 remain in mesh during swinging of the conveyor 2 between its in-use and out-of-use positions. The gear wheel 16 is secured to a shaft 20 which projects downwards parallel to the shaft 5 through the bottom of the collar 6 and carries a sprocket wheel 21 externally. The latter is connected by a chain 22 to a sprocket wheel 23 on the lower end of the auger shaft 5 which projects through the bottom wall 3A of the conduit 3. The plate 9 is attached to the tank 1 by a bracket 24.

Because of the rotary connection of the conveyor 2 to the tank 1, the connection is permanent, and grain cannot fall from the tank 1 to the ground through the passage 11, during swinging of the conveyor 2 between its in-use and out-of-use positions. The casing 17, 18 protects the gear wheels 14, 15, 16 from grain and dust, and the chain drive 21-23 lies out of the path of flow of the grain, so that the auger 4 can extend substantially to the bottom of the conduit 3, as shown, and can elevate substantially all grain entering the conduit 3, and thus eliminate or greatly reduce the possibility of blockages.

In FIG. 3, 24 indicates a hand ratchet lever for use in swinging the conveyor 2 between its in-use and out-of-use positions. The lever 24 is pivotally connected by a link 25 in any convenient manner to the conduit 3.

The FIG. 2 embodiment is generally similar to the FIG. 1 embodiment, and only the differences will be described, like parts being indicated by like numerals with the addition of the suffix A. In FIG. 2, the gear wheels 14A and 16A mesh directly, there being no intermediate gear, and neither of the rotary axes of the gear wheels 14A, 16A coincide with the axis AB. The gear wheel 14A thus disengages the gear wheel 16A when the conveyor 2A is swung to its out-of-use position. The teeth of the gear wheels 14A and 16A may be specially shaped to facilitate re-engagement.

The gear wheel 14 is preferably splined on the shaft 13, so that attachment and detachment of the conveyor 2 to and from the tank 1 is facilitated. That is to say, the conduit 3, the casing 17, 18 and the plate 9 together form a unit, which is attached simply by registering the gear wheel 14 with the shaft 13 and pushing the conveyor 2 towards the shaft 13 until the latter is engaged by the gear wheel 14, and then securing the bracket 24 to the tank 1. Detachment can be effected in the reverse manner. This also applies to the FIG. 2 and 4 embodiments.

With reference to the embodiment shown in FIGS. 4 and 5, this also is generally similar to the FIG. 1 embodiment and only the differences will be described, like parts being indicated by like numerals with the addition of the suffix B.

In FIG. 4, instead of the gear wheel 15B meshing with the gear wheel 16B, the shaft 26 of the gear wheel 15B carries a gear wheel 27 which meshes with gear wheel 16B.

The tank 1B has an outwardly projecting neck 28 removably bolted to it, and the neck 6B has an annular flange 29. The neck 6B also has an annular flange 30 which bears rotatably on the flange 29, and is located in an annular channel defined by the flange 29 and holding segments 31 bolted thereto and having lips 32 overlapping the flange 30. Only one segment 31 is shown in FIG. 4. The casing parts 17B, 18B for the bevel gear wheels have bearing surfaces at 33.

In FIG. 5, the conveyor 2B is shown in full lines in a raised in-use position, and in chain-dotted lines in its lowered out-of-use position at 2AB. In its raised position, the conveyor 2B can be adjusted fore-and-aft as indicated by the arrow 34 and the chain-dotted lines 35, 36. A hand lever 37 attached to the conduit 3B is provided for moving the conveyor 2B, and cooperates with a segment 38 for locking it in position. A spring 39 is provided for assisting raising of the conveyor 2B.

In a modification, movement of the conveyor 2B is effected by a hydraulic ram, which replaces the spring 39, and is controlled from the driver's seat.

The bottom outer corner of the unloading conveyor conduit may be bevelled, as indicated by the line 3X in FIG. 4, so as to prevent the possibility of grain collecting in the corner.

I claim:

1. Grain handling apparatus comprising a tank for temporarily storing harvested grain, a discharge opening in the bottom of the tank, a substantially horizontal transfer conveyor in the tank for conveying grain to the discharge opening, a discharge conveyor mounted on the tank for unloading grain from the tank and depositing it into a suitable receptacle, means rotatably mounting the inlet end of the discharge conveyor in continuous communication with the discharge opening for movement between an unloading position inclined outwardly and upwardly from the discharge opening and an out of use position, said transfer conveyor including a transfer auger, said discharge conveyor including a conduit and discharge auger rotatably journaled in the conduit and drive means connecting the discharge end of the transfer auger to the inlet end of the discharge auger including an intermediate shaft rotatable about an axis parallel to the axis of the discharge auger, bevel gearing to connect one end of the intermediate shaft to the transfer auger including a bevel gear on the transfer auger, a bevel gear on one end of the intermediate shaft, and an intermediate bevel gear meshing with the bevel gear on the transfer auger and the bevel gear on the intermediate shaft, said intermediate bevel gear being rotatable about an axis which coincides with the axis of rotation of the inlet end of the discharge conveyor and torque transmitting means outside the tank and the discharge conveyor conduit for connecting the intermediate shaft to one end of the discharge auger.

2. The grain handling apparatus of claim 1 wherein the torque transmitting means outside the tank and the discharge conveyor conduit includes a sprocket on the intermediate shaft, a sprocket on the lower end of the discharge auger, and an endless belt trained around both sprockets.

3. The grain handling apparatus of claim 2 wherein a hydraulic ram is provided for effecting movement of the unloading conveyor between an unloading position and an out of use position.

* * * * *